US007017973B2

(12) United States Patent
Sera et al.

(10) Patent No.: US 7,017,973 B2
(45) Date of Patent: Mar. 28, 2006

(54) APPARATUS FOR DRIVING TO OPEN AND CLOSE VEHICULAR CLOSING STRUCTURE

(75) Inventors: Osamu Sera, Wako (JP); Toshihisa Omori, Wako (JP); Kazunari Ochi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/848,335

(22) Filed: May 18, 2004

(65) Prior Publication Data

US 2004/0232723 A1 Nov. 25, 2004

(30) Foreign Application Priority Data

May 19, 2003 (JP) ............................. 2003-140096

(51) Int. Cl.
*B60J 5/10* (2006.01)
*E05F 15/12* (2006.01)

(52) U.S. Cl. ............................... 296/146.1; 296/146.4; 296/146.8; 49/340

(58) Field of Classification Search ............. 296/146.1, 296/146.4, 146.8, 146.11; 49/339, 340, 341
See application file for complete search history.

(56) References Cited

U.S. PATENT DOCUMENTS 5,448,856 A * 9/1995 Moore et al. ................. 49/340
6,142,551 A * 11/2000 Ciavaglia et al. ............. 296/56
6,382,706 B1 * 5/2002 Yuge et al. .............. 296/146.4
6,398,288 B1 * 6/2002 Yuge ....................... 296/146.4
6,478,357 B1 * 11/2002 Zhou ........................... 296/56
6,719,356 B1 * 4/2004 Cleland et al. .......... 296/146.8
6,776,448 B1 * 8/2004 Matsui et al. ............ 296/146.4
2001/0033086 A1 * 10/2001 Yuge et al. ................... 296/56
2003/0030299 A1 * 2/2003 Cleland et al. .......... 296/146.8

FOREIGN PATENT DOCUMENTS

DE 101 14 938 A1 10/2001
JP 2001-107642 4/2001

* cited by examiner

*Primary Examiner*—Patricia L. Engle
(74) *Attorney, Agent, or Firm*—Rankin, Hill, Porter & Clark LLP

(57) ABSTRACT

An apparatus is provided in which a motor 11 with reduction gears, a clutch 12 and a gas stay are provided between a vehicle body 2 and a tailgate 1 so that a fully opened position of the tailgate can be held by virtue of a thrust of the gas stay only, and in this apparatus, when a closure of the tailgate from its own weight is detected after the motor with reduction gears is disconnected, the motor with reduction gears is connected to the tailgate to drive to forcibly close it after the tailgate is driven to be opened to the fully opened position thereof. By this construction, when the holding force of the opened position is short, since the tailgate is closed after it is opened to the fully opened position once, cargo loading and unloading work can be completed while the tailgate is so closed.

6 Claims, 5 Drawing Sheets

APPARATUS FOR DRIVING TO OPEN AND CLOSE VEHICULAR CLOSING STRUCTURE

BACKGROUND OF THE INVENTION

The present invention relates to a driving apparatus for automatically opening and closing a vehicular closing structure using power of a driving source such as a motor.

A tailgate provided to cover a rear end opening formed in a vehicle such as a station wagon which opens in a swing-up fashion tends to be relatively heavy and requires a large operating force to be opened. Due to this, it is a general practice to provide a so-called gas stay comprising a cylinder that is filled with oil and gas not only to assist in securing a required operating force in the opening direction but also to generate a holding force in an opened condition.

It seems to happen sometimes that the gas stay becomes short of thrust for holding the tailgate at the opened position due to a change in weight of the tailgate, a change in rotational resistance of a hinge portion and a change in ambient temperature.

As a technique for dealing with the inconvenience like this, a technique is proposed in JP-A-2001-107642 in which an opening and closing driving apparatus using a motor with reduction gears is provided between a tailgate and a vehicle body, then, when the movement of the tailgate in the closing direction from its own weight is detected, a clutch is engaged so as to allow a resisting force of the motor with reduction gears to be applied to the tailgate to thereby stop the closure of the tailgate from its own weight, and thereafter the tailgate is forcibly driven to be closed.

[Patent Literature No. 1]

JP-A-2001-107642

According to the structure of the related art, however, when the holding force of the tailgate's opened position is short, the tailgate is forcibly driven to be closed unconditionally, and nothing on cargo loading and unloading work is taken into consideration. In addition, while the movement of the tailgate in the closing direction due to the lack of required holding force of the tailgate's opened position is determined based on a descending amount of the tailgate, even in the event that the holding force of the opened position of the tailgate is in balance with the weight of the tailgate, since the traveling amount of the tailgate varies temporarily due to the effects of vehicle posture or the wind, it is not right in reality to determine the appropriateness of the holding force of the opened position of the tailgate based only on the descending amount of the tailgate.

SUMMARY OF THE INVENTION

The invention is made in order to solve the problem, and a main object thereof is to provide an apparatus for driving to open and close a vehicular closing structure which allows cargo loading and unloading work to be carried out while preventing the closure of the tailgate from its own weight and, moreover, which can inform accurately the user of a vehicle that it looks like that there is occurring a shortage of force for holding the opened position of the tailgate.

With a view to attaining the object, according to the invention, there is provided an apparatus for driving to open and close a vehicular closing structure including an opening and closing driving force generating unit (a motor 11 with reduction gears), a clutch unit (12) for making and breaking the transmission of a driving force to a closing structure (a tailgate 1) provided on a vehicle body (2) in such a manner as to swing up vertically with respect to the vehicle (2), and an opening direction biasing unit (a gas stay 4) including a gas-filled cylinder, which units are all provided between the vehicle body and the closing structure, wherein the opening and closing driving force generating unit is disconnected from the closing structure just before a fully opened position of the closing structure is reached, so that the fully opened position of the closing structure is held by virtue of a biasing force of the opening direction biasing unit only, and according to a first aspect of the invention, there is provided a control unit (a control circuit 15) for, when a closure of the closing structure from its own weight is detected after the disconnection of the opening and closing driving force generating unit, connecting the opening and closing driving force generating unit to the closing structure so as to drive to open the closing structure a predetermined amount, and thereafter driving to close the closing structure.

According to the construction of the apparatus in this way, when there occurs a closure of the closing structure from its own weight, since the closing object is driven to open to, for example, the fully opened position, cargo loading and unloading work can be completed during the driving of the closing structure.

According to a second aspect of the invention, there is provided a control unit for, when a closure of the closing structure from its own weight is detected after the disconnection of the opening and closing driving force generating unit, connecting the opening and closing driving force generating unit to the closing structure so as to drive to open the closing structure just before the fully opened position of the closing structure is reached, thereafter performing the disconnection again, then, when a closure of the closing structure from its own weight is detected again, connecting the opening and closing driving force generating unit to the closing structure so as to drive to open the closing structure a predetermined amount, and thereafter driving to close the closing structure.

By this construction, since the occurrence of the closure of the closing structure from its own weight is confirmed by driving to open the closing structure to the position where the transmission of the driving force of the opening and closing driving force generating unit is broken at the normal time and thereafter breaking the transmission of the driving force again, a discrimination can be performed in an ensured fashion between a case where the closing structure moves temporarily to the closing direction by, for example, being fanned by the wind and a case where the closing structure moves in the closing direction as a result of the lack of holding force of the opened position relative to the closing structure.

According to a third aspect of the invention, there is provided a control unit for, when a closure of the closing structure from its own weight is detected after the disconnection of the opening and closing driving force generating unit, connecting the opening and closing driving force generating unit to the closing structure so as to drive to open the closing structure by an amount in which the closing structure closed then from its own weight, thereafter performing the disconnection again, then, when a closure of the closing structure from its own weight is detected again, connecting the opening and closing driving force generating unit to the closing structure so as to drive to open the closing structure a predetermined amount, and thereafter driving to close the closing structure.

By this construction, even in the event that the closure of the closing structure from its own weight does not happen when the opening and closing driving force generating unit is disconnected due to the remaining holding force of the opened position relative to the closing structure, the confirmation can be carried out under the same condition.

According to a fourth aspect of the invention, there is provided a control unit for repeating until the closing structure reaches a fully closed position thereof a control such that when a closure of the closing structure from its own weight is detected after the disconnection of the opening and closing driving force generating unit, in the event that an amount of closure of the closing structure from its own weight reaches a predetermined value, the opening and closing driving force generating unit is connected to the closing structure so as to drive to open the closing structure by a predetermined amount which is smaller than the amount of closure of the closing structure from its own weight, and thereafter the opening and closing driving force generating unit is disconnected.

By this construction, in the event that there occurs a shortage of the holding force of the opened position relative to the closing structure, since the closing structure performs an unusual operation in which the closing structure closes after it has opened slightly, and again the closing structure closes after it has opened slightly, a time for cargo loading and unloading work can be secured, and the user of the vehicle can recognize the lack of holding force of the opened position in an ensured fashion.

Besides, according to a generic aspect of the invention, there is provided an apparatus for driving to open and close a vehicular closing structure including between a vehicle body and a closing structure to be capable to swing up vertically with respect to the vehicle body, an opening and closing driving force generating unit, a clutch unit for making and breaking the transmission of a driving force to the closing structure, and an opening direction biasing unit, wherein the opening and closing driving force generating unit is disconnected from the closing structure just before a fully opened position of the closing structure is reached, so that the fully opened position of the closing structure is held by virtue of only a biasing force of the opening direction biasing unit.

DETAILED DESCRIPTION OF THE PREFERRED EMBODIMENTS

Embodiments of the invention will be described below by reference to the accompanying drawings.

Figure 1:
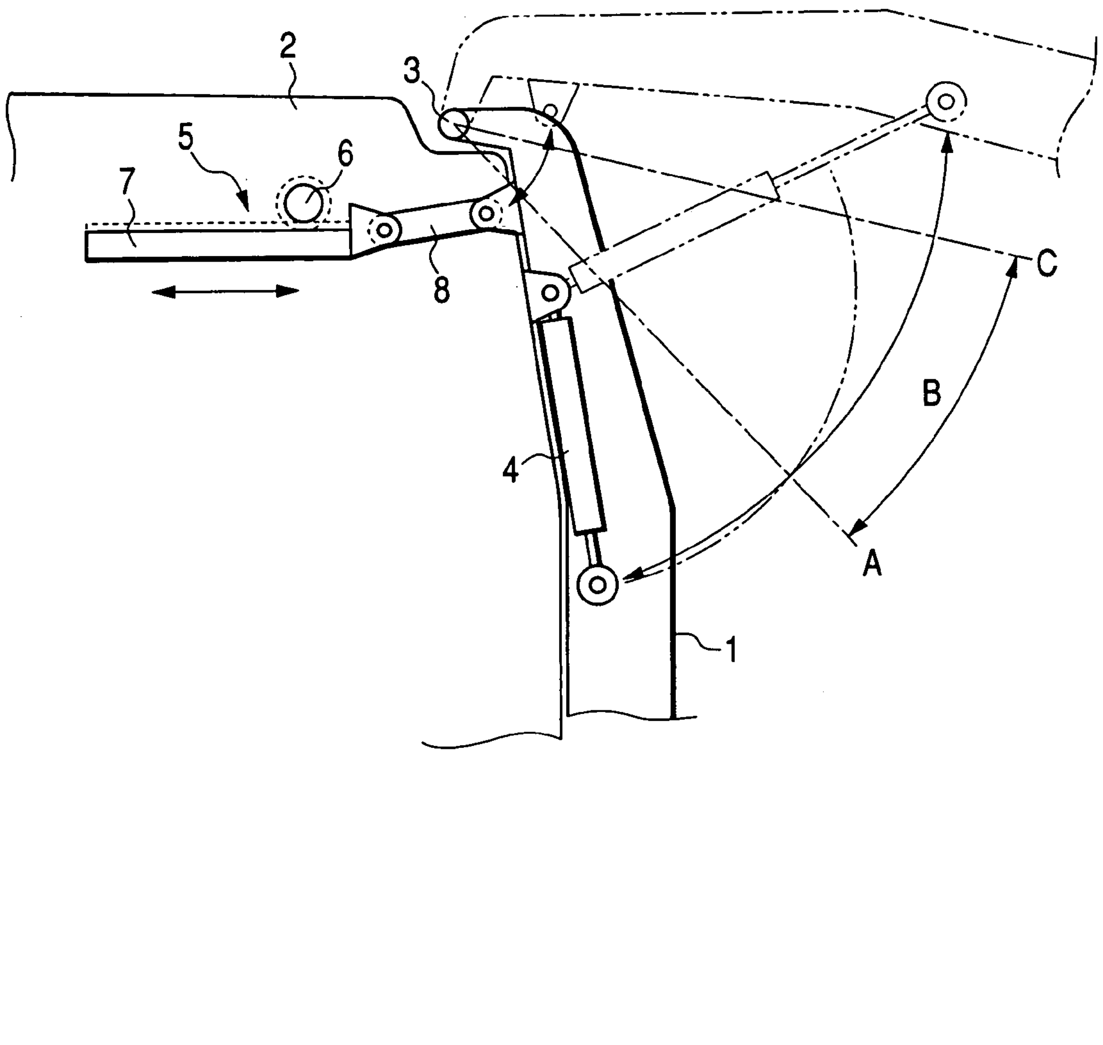
FIG. 1 is a side cross-sectional view of a main part of a tailgate of a station wagon to which the invention is applied.

FIG. 1 shows a main part of a tailgate of a station wagon to which the invention is applied. This tailgate is supported on a vehicle body 2 with hinge shafts 3 which extend in a transverse direction of the vehicle body 2, and is designed to open and close an opening formed at an rear end of the vehicle body by being caused to swing up and down in a vertical direction at its free end.

A known gas stay 4 is provided between an outer edge portion of the tailgate 1 and an inner edge portion of the vehicle body opening which is designed to bias the tailgate 1 in an opening direction with its trust from a certain angle and then to exhibit a holding force at a fully opened position of the tailgate 1 by virtue of a charging pressure within a cylinder of the gas stay 4 which is set to be in balance with the weight of the tailgate 1.

Figure 2:
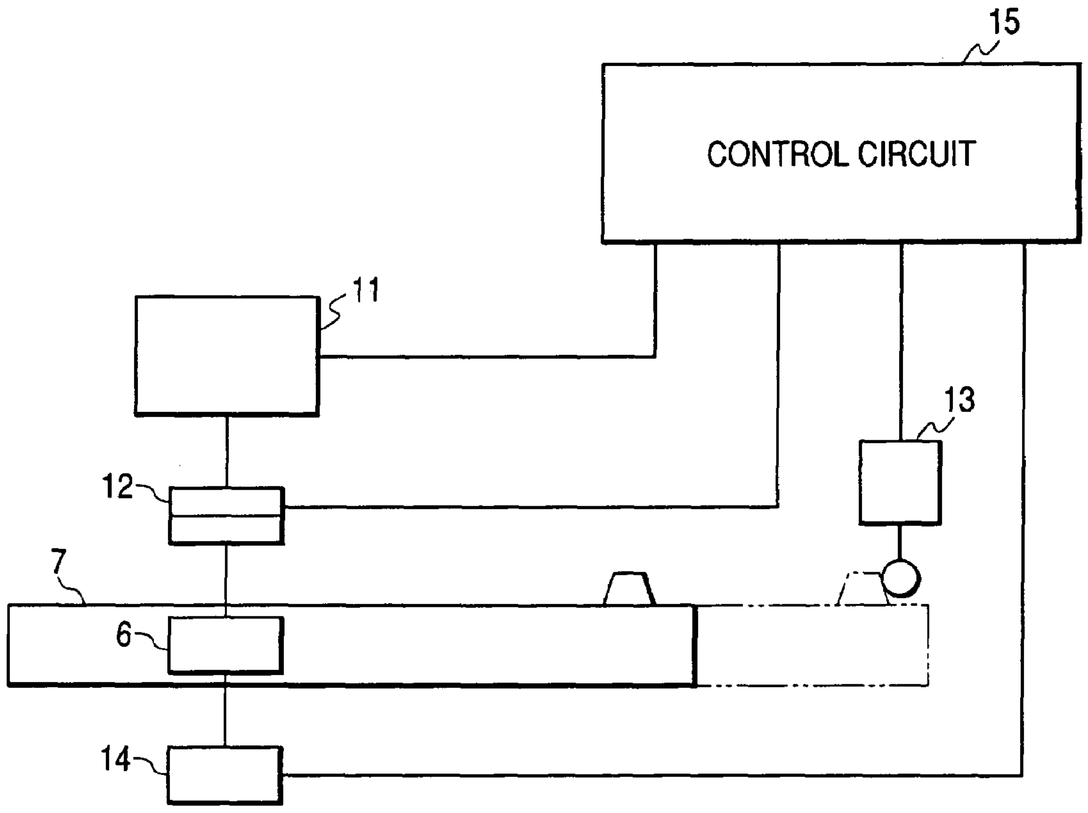
FIG. 2 is a drawing showing the configuration of an apparatus for driving to open and close the tailgate.

As shown in FIG. 2 as well, an apparatus 5 for driving to open and close the tailgate 1 includes a pinion 6 that is driven to rotate by a motor 11 with reduction gears and a rack 7 that meshes with the pinion 6 so as to be driven back and forth along the vehicle body 2 and is designed to driven to open and close the tailgate 1 by converting a rotational force given to the pinion 6 by the motor 11 with reduction gears to a thrust of the rack 7 and imparting the thrust to the tailgate 1 via a link 8.

According to the structure, the thrust of the gas stay 4 does not contribute as a tailgate opening auxiliary force in an area from a fully closed position to a certain opening angle A due to a positional deviation in rotational center between the gas stay 4 and the tailgate 1. In other words, the tailgate 1 is driven to open and close mainly by virtue of the torque of the motor 11 with reduction gears exerted on the pinion 6 in the area up to the angle A.

Then, when passing the angle A, the thrust of the gas stay 4 joins as a tailgate opening auxiliary force and reduces the load of the motor 11 with reduction gears with respect to torque (an area B). When the opening angle continues to increase, since the tailgate can be held only by virtue of the thrust of the gas stay, when the tailgate 1 reaches an angular position C which is positioned just before a fully opened position, the current supplied to the motor 11 with reduction gears is disrupted, a clutch 12 between the motor 11 with reduction gears and the pinion 6 is disengaged, and the transmission of the driving force to the pinion 6 in order to open the tailgate 1 is broken, whereby the holding force of the fully opened position depends fully on the thrust of the gas stay 4.

In the structure like this, in the event that the holding force of the opened position relative to the tailgate 1 becomes short due to a change in weight of the tailgate 1, a change in rotational resistance of the hinge shaft 3 and a change in ambient temperature, there is a probability that the tailgate 1 closes naturally from its own weight.

In order to deal with the inconvenience like this, in the invention, when there occurs a closure of the tailgate 1 from its own weight after the breakage of the transmission of the driving force that is imparted to the pinion 6 at the angular position C, the clutch 12 is engaged and the motor 11 with reduction gears is activated so as to drive to open the tailgate 1 to a predetermined position (for example, to the fully opened position) to thereby prevent the occurrence of problem with cargo loading and unloading work that would otherwise occur due to the closure of the tailgate from its own weight.

Figure 3:
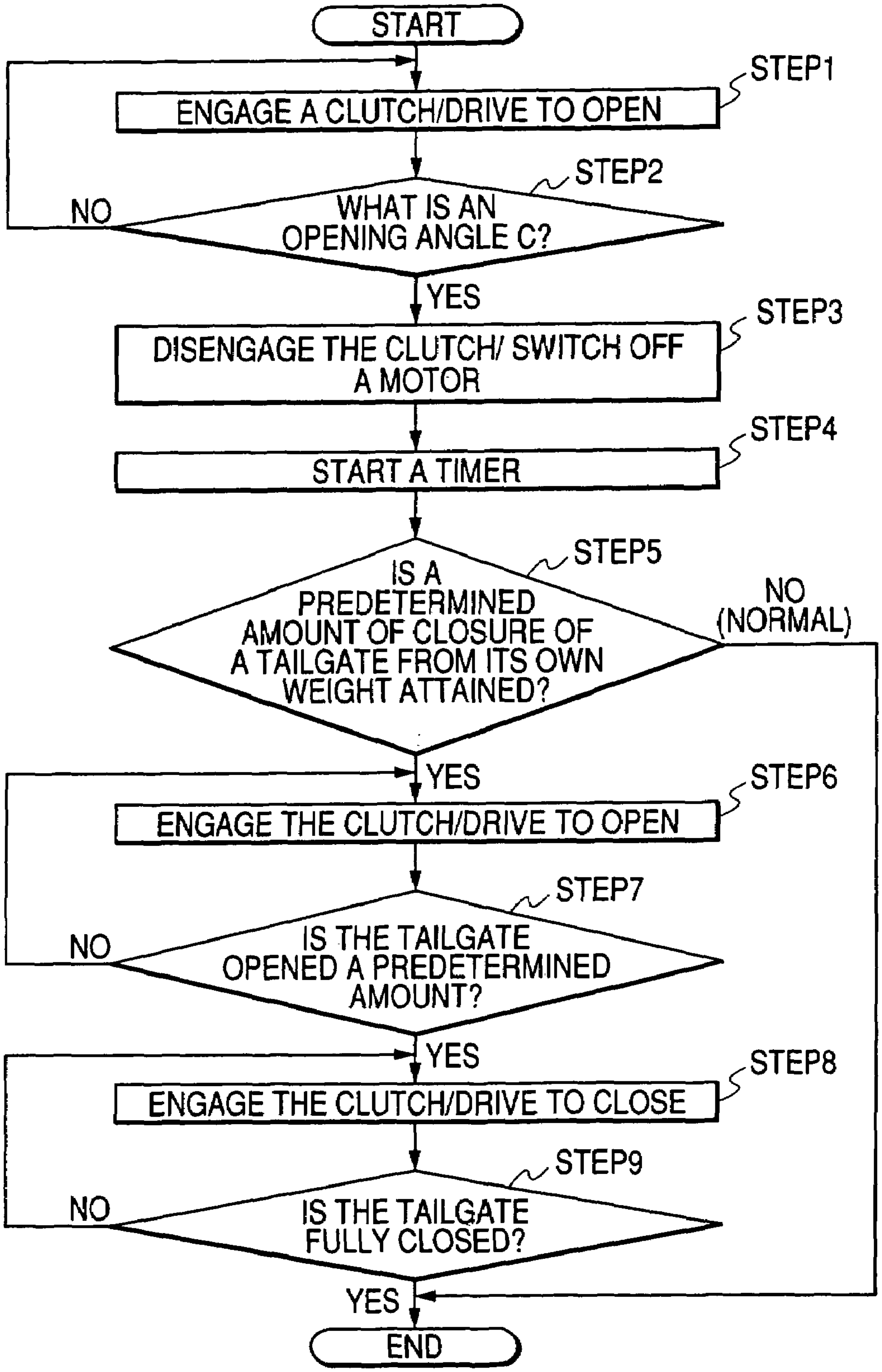
FIG. 3 is a flowchart explaining an operation according to a first embodiment of the invention.

An operation according to the control of the invention will be described by reference to FIG. 3. Firstly, the clutch 12 is engaged, and the motor 11 with reduction gears is driven to open the tailgate 1 (step 1). Then, the opening angle of the tailgate 1 is monitored (step 2), and if an arrival of the tailgate 1 at the predetermined angular position C is confirmed, the clutch 12 is disengaged and the motor 11 with reduction gears is stopped (step 3).

Here, the opening angle of the tailgate 1 can be detected by inputting a contact signal of a limit switch based on the motion of the rack 7 and a pulse signal of a rotary encoder for detecting the rotational angle and rotational direction of the pinion 6 into a control circuit 15.

Then, an elapsed time after the disengagement of the clutch is counted (step 4), and the existence of a closure of the tailgate 1 from its own weight within a predetermined length of time is determined (step 5). Here, if no occurrence of the closure of the tailgate 1 from its own weight is detected, it is determined that the gas stay 4 generates a thrust which matches the weight of the tailgate 1, and the control ends. On the other hand, if an occurrence of a predetermined amount of closure of the tailgate 1 from its own weight within the predetermined length of time is detected in step 5, since there is caused a doubt that the holding force of the opened position of the tailgate 1 is short, with clutch 12 beings engaged and the motor 11 with reduction gears being activated, the tailgate 1 is driven to open by a predetermined amount (for example, until the tailgate 1 reaches the fully opened position) (steps 6, 7).

Here, the detection of a closure of the tailgate 1 from its own weight can be implemented properly by providing a limit switch for detecting a substantial arrival of the tailgate 1 at the fully opened position or a stroke sensor at an appropriate location on the gas stay 4.

Then, in the event that the tailgate 1 opens the predetermined amount, with the clutch 12 continuing to be engaged, the motor 11 with reduction gears is reversed to forcibly drive to close the tailgate 1 until it reaches the fully closed position thereof (steps 8, 9).

Thus, if there occurs the shortage of holding force of the opened position relative to the tail gate 1 and hence the tailgate 1 cannot be held at the opened position, the tailgate 1 is driven to open once to give enough time to perform loading and unloading work, and the shortage of the holding force of the opened position is informed the user of the vehicle in an ensured fashion by forcibly closing the tailgate 1.

Figure 4:
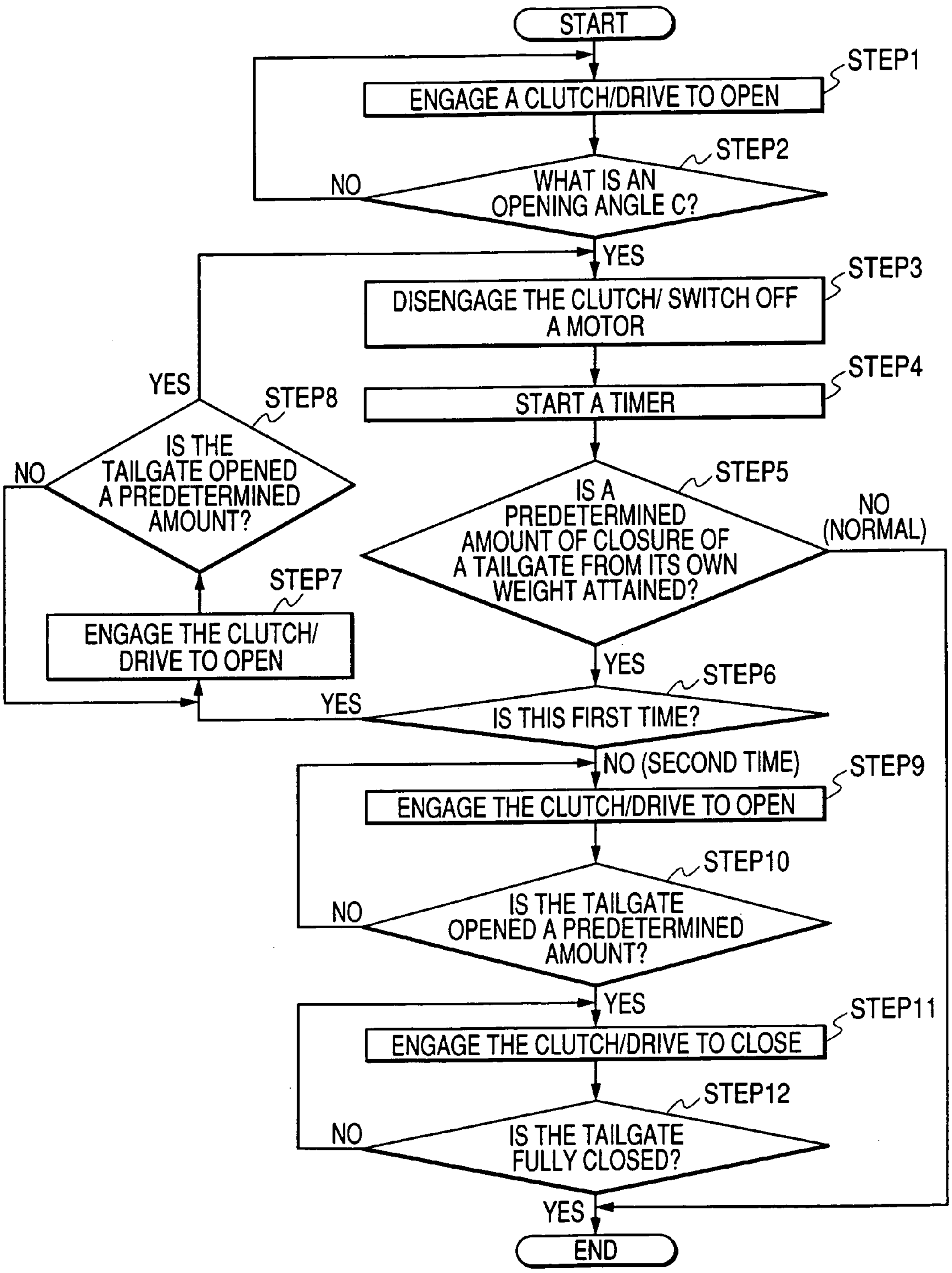
FIG. 4 is a flowchart explaining an operation according to a second embodiment of the invention.

FIG. 4 shows a second embodiment of a control according to the invention. Firstly, as in the case with the first embodiment that is described above, the clutch 12 is engaged and the motor 11 with reduction gears is driven to open the tailgate 1 (step 1). Then, the opening angle of the tailgate 1 is monitored (step 2), and if an arrival of the tailgate 1 at the predetermined angular position C is confirmed, the clutch 12 is disengaged and the motor 11 with reduction gears is stopped (step 3).

Then, an elapsed time after the disengagement of the clutch is counted (step 4), and the existence of a closure of the tailgate 1 from its own weight within a predetermined length of time is determined (step 5). Here, if no occurrence of the closure of the tailgate 1 from its own weight is detected, it is determined that the holding force of the opened position relative to the tailgate 1 is normal, and the control ends. On the other hand, if an occurrence of a predetermined amount of closure of the tailgate 1 from its own weight within the predetermined length of time is detected in step 5, it is confirmed that this is a first check (step 6), and if this check is a first one, the clutch 12 is engaged and the motor 11 with reduction gears is activated so as to drive to open the tailgate 1 by a predetermined amount, that is, to for example the angular position C where the clutch 12 is engaged and the motor 11 with reduction gears is stopped at the normal time (steps 7, 8).

Then, when the opening angle of the tailgate 1 has reached the predetermined position C, the clutch 12 is disengaged again, and the motor 11 with reduction gears is stopped (step 3). Moreover, a timer is counted (step 4) so as to determine whether or not a closure of the tailgate 1 from its own weight in the predetermined amount within the predetermined length of time occurs (step 5). If it is determined that no closure of the tailgate 1 from its own weight has occurred, since the previous defective action is understood to have occurred due to vibrations or being fanned by the wind and the holding force of the opened position relative to the tailgate 1 is determined to be normal, the control ends.

In contrast, if the occurrence of the closure of the tailgate 1 from its own weight is detected irrespective of the previous driving to open the tailgate 1, and if it is confirmed in step 6 that this is a second check, it is determined that the holding force of the opened position of the tailgate 1 is being short, and the clutch 12 is engaged and the motor 11 with reduction gears is driven to open the tailgate 1 by a predetermined amount (for example, to the fully opened position) (steps 9, 10).

Then, if the tailgate 1 is opened the predetermined amount which may be the fully opened position, with the clutch 12 being left engaged, the motor 11 with reduction gears is reversed so as to drive to forcibly close the tailgate 1 until it reaches the fully closed position (steps 11, 12).

Thus, after whether the tailgate 1 has moved to close due to the shortage of holding force of the opened position relative to the tailgate 1 or due to vibrations or being fanned by the wind is confirmed, and if it is confirmed that the closure has occurred due to the shortage of the holding force of the opened position relative to the tailgate 1, the tailgate 1 is driven to open once so as to give enough time to perform the cargo loading and unloading work, and the tailgate 1 is forcibly driven to be closed to let the user of the vehicle know that the holding force of the opened position seems to be short in an ensured fashion.

Thus, while the control is described which is designed to deal with a case where the clutch 12 is disengaged just before the fully opened position of the tailgate 1, the motor 11 with reduction gears is stopped, and the closure of the tailgate from its own weight occurs from that position, in reality, there may be a case depending on the degree of shortage of the holding force of the opened position relative to the tailgate 1 where the closure of the tailgate from its own weight does not start immediately the clutch 12 is disconnected just before the fully opened position but after the tailgate 1 is raised to some extent. As this occurs, in the event that a traveling amount in the closing direction from the position where the clutch 12 is disengaged is used as a reference, there may be caused a risk that the determination of shortage of the holding force of the opened position fails. In order to deal with the inconvenience like this, a timing at which the clutch 12 is re-engaged may be regulated by an absolute value of the traveling amount of the tailgate in the closing direction. According to the construction of the control in this way, a flexible abnormality determination can be performed irrespective of the degree of shortage of the holding force of the opened position.

Figure 5:
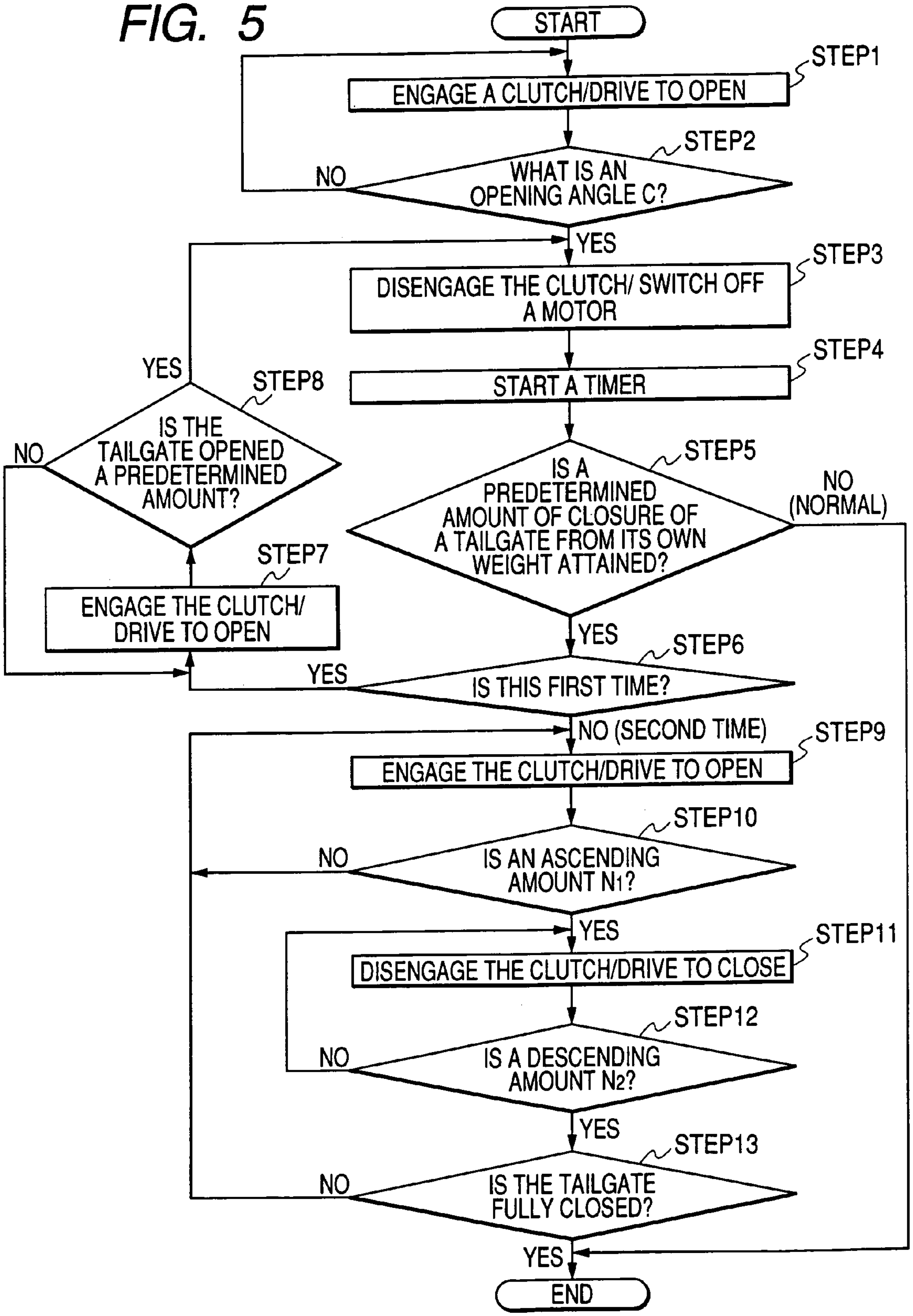
FIG. 5 is a flowchart explaining an operation according to a third embodiment of the invention.

FIG. 5 shows a third embodiment of the invention. In this control flow, processes up to step 8 are similar to those described with respect to the second embodiment, and hence the description thereof will be omitted here. A difference between the control according to the second embodiment and the control according to this embodiment resides in processes after step 8; in step 9, the clutch 12 is engaged to drive to open the tailgate 1, and if the arrival of a then ascending amount (a tailgate opening amount) at a predetermined value N1 is detected (step 10), the motor 11 with reduction gears is reversed to drive to close the tailgate 1 (step 11). Then, if a descending amount then (an amount of closure of the tailgate from its own weight) is detected to reach a second predetermined value N2 which is larger than the first predetermined value N1 (N1<N2) (step 12), the flow returns to step 9, where the motor 11 with reduction gears is rotated forward so as to drive to raise the tailgate 1 by the predetermined value N1. These ascending and descending motions (steps 9 to 12) are repeated until the tailgate 1 reaches the fully closed position thereof (step 13).

Thus, in the event that the opened position of the tailgate 1 cannot be held due to the shortage of holding force of the opened position relative to the tailgate 1, not only is enough time to perform the cargo loading and unloading work given but also the shortage of holding force of the opened position of the tailgate 1 is informed the user of the vehicle in the ensured fashion by performing forcibly the unusual tailgate closing operation with intention.

Note that while the reduction gear ratio of the reduction gears attached to the motor may be increased such that the tailgate is held open even after the motor is stopped or may be determined to such an extent that the tailgate is closed moderately by virtue of the counter electromotive force of the motor, in the event that the reduction gear ratio is determined to the extent that the tailgate is closed moderately by virtue of the counter electromotive force of the motor, when there occurs a shortage of the holding force of the opened position of the tailgate 1, the motor 11 is switched off with the clutch 12 being left engaged so that the tailgate 2 can be closed moderately.

As is described heretofore, according to the first aspect of the invention, when a closure of the closing structure from its own weight is detected after the disconnection of the opening and closing driving force generating unit, since the opening and closing driving force generating unit is connected to the closing structure so that the closing structure is driven to open to, for example, the fully opened position and thereafter is driven to close the closing structure, the cargo loading and unloading work can be completed while the closing structure is raised to the fully opened position once.

According to the second aspect of the invention, when a closure of the closing structure from its own weight is detected after the disconnection of the opening and closing driving force generating unit, since the opening and closing driving force generating unit is connected to the closing structure so as to drive to open the closing structure just before the fully opened position is reached, thereafter performing the disconnection again, to confirm whether or not another closure of the closing structure from its own weight occurs then, a discrimination can be performed in an ensured fashion between a case where the closing structure moves temporarily to the closing direction by, for example, being fanned by the wind and a case where the closing structure moves in the closing direction as a result of the lack of holding force of the opened position relative to the closing structure.

According to the third aspect of the invention, when a closure of the closing structure from its own weight is detected after the disconnection of the opening and closing driving force generating unit, since the opening and closing driving force generating unit is connected to the closing structure so as to drive to open the closing structure by the amount in which the closing structure closed then from its own weight, thereafter performing the disconnection again, to confirm whether or not another closure of the closing structure from its own weight occurs then, even in the event that the closure of the closing structure from its own weight does not happen when the opening and closing driving force generating unit is disconnected due to the remaining holding force of the opened position relative to the closing structure, the confirmation can be carried out under the same condition.

According to the fourth aspect of the invention, when a closure of the closing structure from its own weight is detected after the disconnection of the opening and closing driving force generating unit, or in the event that the holding force of the opened position is determined to be short, since the closing structure performs the unusual operation in which the closing structure closes after it has opened slightly, and again the closing structure closes after it has opened slightly, the user of the vehicle is allowed to recognize the lack of holding force of the opened position in an ensured fashion, and moreover, since this operation can give a longer time before the closing structure is fully closed, the cargo loading and unloading work can be completed during which the structure is fully closed.

What is claimed is:

1. An apparatus for driving to open and close a vehicular closing structure, comprising:

between a vehicle body and a closing structure that is capable to swing up vertically with respect to the vehicle body:

an opening and closing driving force generating unit, a clutch unit for making and breaking transmission of a driving force to the closing structure, and an opening direction biasing unit, a control unit for monitoring a position of said closing structure and a direction of movement of said closing structure, and for controlling operation of the clutch unit and the opening and closing driving force generating unit, wherein:

when driving force is being transmitted from said opening and closing driving force generating unit to said closing structure to move said closing structure in an opening direction, and said closing structure is determined by said control unit to have reached a predetermined position before a fully opened position, the control unit is operable to disconnect the opening and closing driving force generating unit from the closing structure so that the closing structure moves into the fully opened position, and is thereafter held in the fully opened position, by virtue of only a biasing force of the opening direction biasing unit; and;

wherein said control unit is operable, after the disconnection of the opening and closing driving force generating unit from the closing structure, to detect closing of the closing structure from a weight thereof and to thereafter connect the opening and closing driving force generating unit to the closing structure so as to drive to open the closing structure a predetermined amount, and thereafter driving to close the closing structure.

2. The apparatus according to claim 1, wherein:

said control unit is operable to repeat a control procedure in which, after again disconnecting the opening and closing driving force generating unit from the closing structure, in the event that an amount of closure of the closing structure from the weight thereof reaches a predetermined value, the opening and closing driving force generating unit is connected to the closing structure so as to drive the closing structure open a second predetermined amount that is smaller than the predetermined value, and then to disconnect the opening and closing driving force generating unit from the closing structure.

3. An apparatus for driving to open and close a vehicular closing structure, comprising:

between a vehicle body and a closing structure that is capable to swing up vertically with respect to the vehicle body:

an opening and closing driving force generating unit, a clutch unit for making and breaking transmission of a driving force to the closing structure, and an opening direction biasing unit, a control unit for monitoring a position of said closing structure and a direction of movement of said closing structure, and for controlling operation of the clutch unit and the opening and closing driving force generating unit, wherein:

when driving force is being transmitted from said opening and closing driving force generating unit to said closing structure to move said closing structure in an opening direction, and said closing structure is determined by said control unit to have reached a predetermined position before a fully opened position, the control unit is operable to disconnect the opening and closing driving force generating unit from the closing structure so that the closing structure moves into the fully opened position, and is thereafter held in the fully opened position, by virtue of only a biasing force of the opening direction biasing unit; and, wherein said control unit is operable, after the disconnection of the opening and closing driving force generating unit from the closing structure, to detect closing of the closing structure from a weight thereof and to thereafter connect the opening and closing driving force generating unit to the closing structure so as to drive to open the closing structure to the predetermined position just before the fully opened position of the closing structure is reached, thereafter again disconnecting the opening and closing driving force generating unit from the closing structure and, then, when closing of the closing structure from the weight thereof is detected again, connecting the opening and closing driving force generating unit to the closing structure so as to first drive the closing structure open a predetermined amount, and then to drive the closing structure to close the closing structure.

4. The apparatus according to claim 3, wherein:

said control unit is operable to repeat a control procedure in which, after again disconnecting the opening and closing driving force generating unit from the closing structure, in the event that an amount of closure of the closing structure from the weight thereof reaches a second predetermined value, the opening and closing driving force generating unit is connected to the closing structure so as to drive the closing structure open a predetermined amount that is smaller than the predetermined value, and then to disconnect the opening and closing driving force generating unit from the closing structure.

5. An apparatus for driving to open and close a vehicular closing structure, comprising:

between a vehicle body and a closing structure that is capable to swing up vertically with respect to the vehicle body:

an opening and closing driving force generating unit, a clutch unit for making and breaking transmission of a driving force to the closing structure, and an opening direction biasing unit, a control unit for monitoring a position of said closing structure and a direction of movement of said closing structure, and for controlling operation of the clutch unit and the opening and closing driving force generating unit, wherein:

when driving force is being transmitted from said opening and closing driving force generating unit to said closing structure to move said closing structure in an opening direction, and said closing structure is determined by said control unit to have reached a predetermined position before a fully opened position, the control unit is operable to disconnect the opening and closing driving force generating unit from the closing structure so that the closing structure moves into the fully opened position, and is thereafter held in the fully opened position, by virtue of only a biasing force of the opening direction biasing unit; and, wherein said control unit is operable, after the disconnection of the opening and closing driving force generating unit from the closing structure, to detect closing of the closing structure from a weight thereof and to thereafter connect the opening and closing driving force generating unit to the closing structure so as to drive to open the closing structure by an amount in which the closing structure closed from the weight thereof, again disconnecting the opening and closing driving force generating unit from the closing structure and, then, when closing of the closing structure from the weight thereof is detected again, connecting the opening and closing driving force generating unit to the closing structure so as to first drive the closing structure open a predetermined amount, and then to drive the closing structure to close the closing structure.

6. The apparatus according to claim 5, wherein:

said control unit is operable to repeat a control procedure in which, after again disconnecting the opening and closing driving force generating unit from the closing structure, in the event that an amount of closure of the closing structure from the weight thereof reaches a predetermined value, the opening and closing driving force generating unit is connected to the closing structure so as to drive the closing structure open a second predetermined amount that is smaller than the predetermined value, and then to disconnect the opening and closing driving force generating unit from the closing structure.

* * * * *